United States Patent
Cox et al.

(10) Patent No.: US 6,436,454 B1
(45) Date of Patent: *Aug. 20, 2002

(54) MANUFACTURE OF A FROZEN FOOD PRODUCT

(75) Inventors: David Robert Cox; Luke Oliver Heeney, both of Bedford; Stephen Raymond Moore, Thrapston, all of (GB)

(73) Assignee: Good Humor-Breyers Ice Cream, Division of Conopco, Inc., Green Bay, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/865,010

(22) Filed: May 29, 1997

(30) Foreign Application Priority Data

May 31, 1996 (EP) .............................................. 96303966

(51) Int. Cl.⁷ ................................................ A23G 9/02
(52) U.S. Cl. ...................... 426/101; 426/104; 426/303; 426/305; 426/565; 426/660
(58) Field of Search ................... 426/100, 101, 426/660, 565, 302, 303, 305, 104

(56) References Cited

U.S. PATENT DOCUMENTS

| | | | | |
|---|---|---|---|---|
| 1,138,929 A | * | 5/1915 | Boyd .............................. 107/8 |
| 1,638,548 A | * | 8/1927 | Nelson ......................... 426/101 |
| 2,007,572 A | * | 7/1935 | Jancsy .......................... 107/54 |
| 2,048,364 A | * | 7/1936 | Willems ....................... 426/101 |
| 2,172,182 A | * | 9/1939 | Thomas .......................... 107/8 |
| 2,212,863 A | * | 8/1940 | Hughes ........................... 107/8 |
| 2,214,374 A | * | 9/1940 | Hughes .......................... 107/8 |
| 2,360,559 A | * | 10/1944 | Glazer ......................... 426/660 |
| 2,747,525 A | * | 5/1956 | Lund ............................ 107/54 |
| 3,274,958 A | * | 9/1966 | Otken .......................... 107/54 |
| 3,328,972 A | * | 7/1967 | Svanoe ......................... 62/123 |
| 3,770,460 A | * | 11/1973 | Vroman ...................... 426/273 |
| 3,894,159 A | | 7/1975 | Franta ......................... 426/284 |
| 4,388,334 A | * | 6/1983 | Deveaux ..................... 426/112 |
| 4,505,121 A | * | 3/1985 | Gram ............................ 62/60 |
| 4,548,045 A | * | 10/1985 | Altares et al. ................. 62/63 |
| 4,551,159 A | * | 11/1985 | Goldstein .................... 62/541 |
| 4,796,441 A | * | 1/1989 | Goldstein .................... 62/354 |
| 4,986,080 A | * | 1/1991 | Grigoli et al. ................. 62/75 |
| 5,000,969 A | * | 3/1991 | Beer ........................... 426/101 |
| 5,256,426 A | * | 10/1993 | Tomioka et al. ............. 426/100 |
| 5,356,648 A | | 10/1994 | Kortschot et al. ........... 426/249 |
| 5,516,540 A | * | 5/1996 | Cathenaut ................... 426/249 |
| 5,556,653 A | * | 9/1996 | Binley ........................ 426/101 |
| 5,620,732 A | * | 4/1997 | Clemmings et al. ........ 426/565 |
| 5,633,029 A | | 5/1997 | Cox et al. .................... 426/565 |
| 5,660,866 A | * | 8/1997 | Tomioka et al. ............. 426/100 |

FOREIGN PATENT DOCUMENTS

| | | |
|---|---|---|
| EP | 321449 | 9/1988 |
| EP | 0500940 | 12/1991 |
| GB | 2251863 | 7/1992 |
| WO | 92/20420 | 11/1992 |
| WO | 95/20883 | 8/1995 |
| WO | 95/26640 | 10/1995 |
| WO | WO 96 16557 | 6/1996 |
| WO | WO 96/16557 | 6/1996 |

OTHER PUBLICATIONS

"The Metastable Zone".
"Crystallization–3ʳᵈ Edition"; J.w. Mullin; Butterworth-–Heinemann; 1993.
Abstract of JP 42/099,965.

* cited by examiner

*Primary Examiner*—Nina Bhat
(74) *Attorney, Agent, or Firm*—Gerard J. McGowan, Jr.

(57) ABSTRACT

A process for the preparation of a coated frozen confectionery product whereby an aqueous solution in the supercooled state is caused to freeze while applied on at least part of the surface of a pre-frozen element of the product.

6 Claims, No Drawings

MANUFACTURE OF A FROZEN FOOD PRODUCT

TECHNICAL FIELD OF THE INVENTION

The invention relates to the manufacture of a frozen food product and products obtained by this method.

BACKGROUND TO THE INVENTION

The present invention relates to improved methodology to prepare frozen confectionery products such as water-ices. In particular the invention relates to composite frozen confectionery products and their method of preparation.

EP 710 074 discloses a method of preparing a composite frozen confectionery product by cooling an ice-cream core, for example with liquid nitrogen followed by applying a water-ice layer thereto. The resulting product has an improved soft texture as compared to traditional split products, however the methodology to obtain the product is energy consuming and requires the use of liquid nitrogen or other strong cooling means.

For this reason there is a desire to find alternative methods which could lead to the preparation of composite frozen confectionery products.

GB 2 251 863 discloses the storage of alcoholic liquors in supercooled state under specific pressures. Upon pouring the liquor into a glass it freezes to a sherbet-like shake.

WO 92/20420 discloses the solidification of a supercooled liquid by subjecting the liquid to ultrasound.

PCT/GB95/02804 (not pre-published) describes the preparation of a suspension of ice-crystals by mixing two solutions which may be supercooled.

Surprisingly it has now been found that composite frozen products containing water-ices or other frozen aqueous solutions of high quality can very conveniently be produced by freezing a supercooled aqueous solution while contacting it with a pre-frozen element of the product. This is surprising as up till now it was believed that the freezing of supercooled liquid was very difficult to control and could not reproducibly be carried out on a single product scale. For example WO 92/20420 describes a very specific freezing apparatus wherein the supercooled liquid is frozen by means of ultrasound.

Accordingly in a first embodiment the invention relates to a process for the preparation of a coated frozen confectionery product whereby an aqueous solution in the supercooled state is caused to freeze while applied on at least part of the surface of a pre-frozen element of the product.

For the purpose of the invention the term coated frozen confectionery product refers to a frozen product which comprises a number of distinct frozen phases at least one of these being made of a frozen aqueous solution applied to the surface of another frozen element. Examples of such coated frozen confectionery products are for example split like products containing an ice-cream core which is at least partly coated with a water-ice layer and layered products for example containing alternating layers of ice-cream and water-ice.

The process for preparing the frozen confectionery product comprises the step of freezing a supercooled aqueous solution. By supercooled is meant that the solution is at a temperature below its melting point but nevertheless still being a solution. Examples of a supercooled system is an aqueous solution which has been cooled to a lower temperature than the melting temperature for the aqueous solution, without ice crystals being formed.

Preferably the aqueous solution has a temperature which is at least 0.5° C. below the melting point, more preferably more than 1° C. below the melting point, most preferably at least 1.5° C. below the melting point. Preferably the temperature is at least 0.1° C. above the metastable limit, more preferred more than 0.5° C., most preferred 1° C. above the metastable limit.

For the purpose of the invention the term aqueous solution refers to any system having a water level of more than 40 wt %, preferably more than 45 wt %, most preferred more than 50 wt %. Preferably the water-level is less than 99.5 wt %, more preferred less than 98 wt %, most preferred less than 95 wt %. The aqueous solution can be a manufactured composition such as a water ice, or a natural solution. Examples of suitable aqueous solutions are ice-cream mixes, sucrose solutions, sugar solutions, plant extracts such as tea, fruit juice, vegetable juice, oil-in-water emulsions and water-ice solutions.

A preferred type of aqueous solution is a water-ice composition. Generally water-ice compositions will contain water with therein sugar or other sweeteners and other optional flavouring ingredients. Suitable levels of sweeteners depend on the type of sweetener and the desired sweetness and may for example vary from 0.01 to 50 wt %. Ingredients such as stabilisers, emulsifiers, buffering agents, colorants etc are also often present. Each of these ingredients will generally be present in minor amount e.g. less than 2 wt %, for example from 0.01 to 1 wt %. Water levels are generally from 50 to 99.9 wt %, more general from 60 to 95 wt %. Water may be added as such or in other forms, for example fruit juices or concentrates. Alcoholic beverages are not embraced within the term water-ice solution.

The supercooled aqueous solution is caused to freeze while contacting it with a pre-frozen element of the product. This can be achieved by any suitable way, for example by subjecting the liquid to a physical or thermal disturbance or a combination thereof. Surprisingly it has been found that in the production of coated frozen confectionery products there is no need for expensive equipment such as ultra sound or sonic equipment.

The supercooled aqueous solution may be brought into contact with the pre-frozen element of the product by any suitable means, for example by co-extrusion or immersion of the pre-frozen element into the supercooled aqueous solution.

Particularly good results are obtained if the aqueous solution is contacted with a pre-frozen further component of the frozen confection. For example the aqueous solution may be sprayed onto a pre-frozen layer or core of water-ice or ice-cream.

A very preferred embodiment of the invention involves the dipping of a pre-frozen core into a supercooled aqueous solution, such as a water ice solution. Surprisingly this leads to a composite frozen confectionery product of very high quality which can easily be prepared at low costs. Surprisingly the dipping of a pre-frozen core can also be done while the supercooled water-ice solution is contained in a bath of considerable size. Contrary to what may be expected the dipping of the ice-cream core into the supercooled bath does not cause the entire bath to freeze. Generally in addition to the layer adjacent to the core only small amounts of ice-crystals will be formed; these tend to float to the surface of the bath and can conveniently be removed. This method therefore allows for the preparation of coated confectionery products having a smooth coating layer with an excellent texture without the need for complicated methods or moulds.

The pre-frozen component to which the aqueous solution is applied can be any pre-frozen element. Examples of suitable elements are frozen cores to which the supercooled aqueous solution is applied or frozen layers onto which the supercooled aqueous solution is applied. Preferably the pre-frozen further component is pre-frozen to a temperature which is below the meta-stable limit of the water-ice solution. Preferably its temperature is at least 1° C. below the metastable limit, more preferably at least 10° C. This effects quick freezing of the aqueous solution. Preferably the pre-frozen component is made of ice-cream or water-ice.

Coated products made in accordance to the invention have a very interesting texture of the frozen aqueous solution. This texture is especially apparent when a supercooled water-ice solution is used as the aqueous solution. Although applicants do not wish to be bound by any theory it is believed that this texture is caused by the specific size orientation and interactions between the ice-crystals in the frozen aqueous solution.

Generally water-ice phases in composite frozen products will be quiescently frozen. This leads to elongated crystal shapes (dendrites), said crystals being aligned in a direction perpendicular to the source of cooling. Also products made in accordance to EP 710 074 provide a smooth coating layer, the coating layer having the presence of elongated crystals aligned in a direction perpendicular to the ice-cream core. This may be contrasted with products made in accordance to EP 500 940 which have a rough, rugged surface coating, the ice crystals present within the coating being elongated crystals which are not predominantly aligned in a certain direction.

Frozen aqueous solutions which have been obtained from supercooled liquids provide a smooth layer, yet show a characteristic structure of dendritic ice crystals which are not predominantly aligned at a certain direction.

The level of alignment can conveniently be measured by determining the homogeneity index for the water-ice. For the purpose of the invention the homogeneity index is the ratio of ice-crystals parallel to the cooling source and perpendicular to the cooling source. Water-ice phases which have been prepared from supercooled water-ice solutions are generally characterised by a homogeneity index of from 0.5 to 2.0, more preferred 0.8 to 1.3. A suitable method of determining the homogeneity index for the water-ice is described in example I.

Accordingly a second embodiment of the invention relates to a coated frozen confection containing a frozen aqueous solution wherein at least part of the frozen aqueous solution has a homogeneity index from 0.5 to 2.0. Preferably all the frozen aqueous solution is water ice. Preferably the entire frozen aqueous solution has a homogeneity index within the above range.

A particularly preferred embodiment of the invention relates to a frozen confection comprising an ice-cream core surrounded by a smooth water-ice layer, the frozen water ice solution having a homogeneity index of from 0.5 to 2.0.

By smooth is meant that the coating layer contains no protrusions greater than 200 microns, preferably no protrusions greater than 150 microns and most preferably no protrusions greater than 100 microns when measured using a 3D imaging surface structure analyzer (NewView 200 from Zygo).

The supercooled aqueous solution can be prepared by any convenient method. A very convenient method involves the placing into contact with a coolant, said coolant having a temperature just above the metastable limit of the aqueous solution e.g. 0.1 to 0.5° C. above the metastable limit.

The invention will now be illustrated by means of the following examples

Example 1

Determination of Homogeneity Index

The homogeneity index of the water-ice in composite frozen confections can be determined as follows by using Scanning Electron Microscopy:

Scanning Electron Microscopy (SEM)—Sample Preparation

1) Prior to preparation the water ice/ice cream sample was stored at −20° C.
2) The sample was removed from storage and cooled on dry ice to −80° C.
3) A 5×5×10 mm block was cut from the sample to include any interfaces between layers/coatings. The block was orientated to give faces parallel to the expected (conventional)direction of ice growth.
4) The block was mounted onto an SEM stub using a proprietary mounting medium (OCT) on the point of freezing (to prevent melting).
5) The stub was immediately plunged into a Nitrogen slush at −210° C.
6) The stub was then mounted onto a stub holder and placed into a CP2000 preparation chamber at $10^{-6}$ torr vacuum.
7) The system was warmed to −98° C. The sample was then fractured.
8) The sample was left to etch for 90 seconds, prior to cooling to −110° C.
9) The surface was coated in Gold-Palladium (conditions: $4 \times 10^{-1}$ bar dry Argon, 6 mA current, coated for 20 seconds).
10) The vacuum was allowed to recover to $10^{-6}$ torr vacuum.
11) The sample was transferred to a JSM 6301F scanning electron microscope for examination at −158° C. (other conditions: 5 kv, 38 mm working distance).

By looking at the picture the source of cooling is identified. For example if a water-ice coating is frozen onto an ice-cream core generally the ice-cream core will be pre-frozen and hence function as the cooling source.

At a distance of 400 μm from the cooling surface a line is drawn parallel to the cooling surface and another line perpendicular to it. Starting from the intersection point of the two lines over a distance of 200 μm (either parallel to the cooling surface or perpendicular moving away from the surface) the number of visually detectable ice-crystal surfaces is counted.

The homogeneity index at a certain point can then be calculated by dividing the number of crystal interfaces at the perpendicular line element by the number of crystal interfaces at the parallel line element.

For calculating the homogeneity index of the water-ice the measurement is repeated at a number of points (preferably at least 3, but generally less than 10) and the average result is taken.

EXAMPLE 2

A previously prepared ice cream blank with a stick inserted (composition: 8.1 wt % butterfat, 7.7 wt % skimmed dried milk powder, 15.25 wt % sugar, 2.5 wt % whey powder, 0.65 wt % stabiliser and emulsifier, 0.054 wt % colour and flavouring, balance water; conventionally produced with 60% overrun) was removed from a blast freezer at −33° C.

The ice cream was dipped into a liquid (i.e. no ice crystals were present) water ice mix (composition: 40 wt % fruit puree, 18 wt % sugar, 3.95 wt % 42 Dextrose-Equivalent glucose powder, 0.2 wt % stabiliser, 0.2 wt % citric acid, 37.6 wt % water—giving a total solids 27.9 wt %) for 30 seconds. A coating of semi-solid water ice encased the inner ice cream core. The product was then hung in a blast freezer (−33° C.) for 20 minutes, then stored at −25° C.

The dipping process was carried out with the water mix at two temperatures; +2° C. (comparison) and −5° C. The melting point of the water ice was −3° C. and the metastable limit was measured to be −7° C. (i.e. the mix at −5° C. was supercooled).

The structure of the coatings were investigated using Scanning Electron Microscopy. The preparation technique is described below in Example 1.

The homogeneity index product formed from the supercooled dipping process was 1.1, whilst the homogeneity index of the conventional dipping process was 0.3.

EXAMPLE 3

As previously produced horizontal layer of ice cream with a thickness of 6 mm (composition: 8.1 wt % butterfat, 7.7 wt % skimmed dried milk powder, 15.25 wt % sugar, 2.5 wt % whey powder, 0.65 wt % stabiliser and emulsifier, 0.054 wt % colour and flavouring, balance water; conventionally produced with 60% overrun) was held at −7° C.

A liquid (i.e. no ice crystals present) water ice mix (composition: 15 wt % sugar, 0.35 wt % stabilisers, 5 wt % lemon concentrate, 0.3 wt % citric acid, balance water) was poured onto the horizontal ice cream layer; the thickness of the water-ice layer was 1–2 mm. A second layer of ice cream at −7° C. was placed onto the water ice layer. The resultant layered product was placed into a blast freezer (−34° C.) for 40 minutes then stored at −25° C.

The pouring process was carried out with the water ice mix at two temperatures: +4° C. (comparison) and −4° C. The melting point of the water ice mix was −2° C. (i.e. the mix at −4° C. was supercooled).

What is claimed is:

1. A process for the preparation of a coated frozen confectionery product comprising applying an aqueous solution selected from the group consisting of water-ice solutions, ice-cream mixes, sugar solutions, fruit juices, and vegetable juices in the supercooled state on at least part of the surface of a pre-frozen element and freezing said applied aqueous solution in the supercooled state.

2. A process according to claim 1, wherein the pre-frozen element has a temperature below the metastable limit of the aqueous solution.

3. A process according to claim 1, wherein the pre-frozen element is ice-cream.

4. A process according to claim 1, wherein the pre-frozen element is dipped into the supercooled aqueous solution.

5. A coated frozen confection obtained by the method of claim 1 containing a frozen aqueous solution, wherein at least part of the frozen aqueous solution has a homogeneity index from 0.5 to 2.0.

6. A frozen confectionery product according to claim 5 comprising an ice-cream core surrounded by a smooth water-ice layer.

\* \* \* \* \*